(12) United States Patent
Yun et al.

(10) Patent No.: US 11,497,364 B2
(45) Date of Patent: Nov. 15, 2022

(54) ROBOT CLEANER AND CONTROLLING METHOD THEREOF

(71) Applicant: Samsung Electronics Co., Ltd., Suwon-si (KR)

(72) Inventors: Deok Sang Yun, Uiwang-si (KR); Sang In Lee, Seoul (KR); Sung Jae Lee, Gwangmyeong-si (KR); Hwan Dong Lee, Seoul (KR); Hyoung Sub Choi, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 16/647,734

(22) PCT Filed: Aug. 31, 2018

(86) PCT No.: PCT/KR2018/010121
§ 371 (c)(1),
(2) Date: Mar. 16, 2020

(87) PCT Pub. No.: WO2019/054675
PCT Pub. Date: Mar. 21, 2019

(65) Prior Publication Data
US 2020/0229661 A1 Jul. 23, 2020

(30) Foreign Application Priority Data

Sep. 14, 2017 (KR) .......................... 10-2017-0117671

(51) Int. Cl.
*A47L 9/04* (2006.01)
*A47L 9/28* (2006.01)

(52) U.S. Cl.
CPC ........... *A47L 9/0466* (2013.01); *A47L 9/0438* (2013.01); *A47L 9/2805* (2013.01); *A47L 9/2836* (2013.01); *A47L 2201/04* (2013.01)

(58) Field of Classification Search
CPC ............. A47L 11/4036; A47L 11/4061; A47L 11/4069; A47L 2201/04; A47L 2201/06;
(Continued)

(56) References Cited

U.S. PATENT DOCUMENTS 5,991,951 A * 11/1999 Kubo ..................... A47L 11/16
15/49.1
8,892,251 B1 * 11/2014 Dooley ............... A47L 11/4011
700/245

(Continued)

FOREIGN PATENT DOCUMENTS

KR   10-2006-0003188 A    1/2006
KR   10-100596479 B1      7/2006
(Continued)

OTHER PUBLICATIONS

KR20150081767A—English Machine Translation (Year: 2015).*
(Continued)

*Primary Examiner* — Marc Carlson
(74) *Attorney, Agent, or Firm* — Jefferson IP Law, LLP

(57) ABSTRACT

Embodiments of the disclosure relate to a robot cleaner and a controlling method thereof, and more particularly, to a robot cleaner and a traveling algorithm of a robot cleaner having an improved structure. A robot cleaner of the disclosure includes a brush unit having a suction flow path, a body unit configured to have a driving device, and be coupled to the brush unit to be rotatable with respect to the brush unit and a redirection device configured to rotate the body unit relative to the brush unit, and the redirection device includes a rotation guide extending along an inner circumferential surface of the brush unit, a rotation driving source disposed in the body unit and generating power, and a power transmission member which moves along the rotation guide by the power transmitted from the rotation driving (Continued)

source and rotates the body unit with respect to the brush unit.

15 Claims, 11 Drawing Sheets

(58) Field of Classification Search
CPC ........ A47L 9/04; A47L 9/0427; A47L 9/0433; A47L 9/0438; A47L 9/0466; A47L 9/2805; A47L 9/2836; A47L 9/2847; A47L 9/2852; B25J 11/00; B25J 19/02; B25J 9/16
See application file for complete search history.

(56) References Cited

U.S. PATENT DOCUMENTS

| | | | | |
|---|---|---|---|---|
| 2003/0229421 | A1* | 12/2003 | Chmura | A47L 9/2894 700/258 |
| 2005/0065662 | A1* | 3/2005 | Reindle | A47L 9/2889 701/1 |
| 2008/0141485 | A1* | 6/2008 | Kim | A47L 9/02 15/354 |
| 2009/0133720 | A1* | 5/2009 | Van Den Bogert | G05D 1/0274 901/46 |
| 2010/0256812 | A1* | 10/2010 | Tsusaka | A47L 9/24 700/254 |
| 2013/0025085 | A1* | 1/2013 | Kim | A47L 9/2889 700/258 |
| 2015/0026920 | A1* | 1/2015 | Hsu | A47L 11/4066 15/403 |
| 2020/0069134 | A1* | 3/2020 | Ebrahimi Afrouzi | G05D 1/0248 |

FOREIGN PATENT DOCUMENTS

| | | | |
|---|---|---|---|
| KR | 100596479 B1 | * | 7/2006 |
| KR | 100783156 B1 | * | 12/2007 |
| KR | 100783156 B1 | | 12/2007 |
| KR | 10-2010-0124912 A | | 11/2010 |
| KR | 10-2014-0101294 A | | 8/2014 |
| KR | 10-2015-0081767 A | | 7/2015 |
| KR | 20150081767 A | * | 7/2015 |

OTHER PUBLICATIONS

KR100783156B1—English Machine Translation (Year: 2007).*
Korean Office Action dated Jan. 24, 2022, issued in Korean Patent Application No. 10-2017-0117671.

* cited by examiner (a) (b)

ROBOT CLEANER AND CONTROLLING METHOD THEREOF

TECHNICAL FIELD

Embodiments of the disclosure relate to a robot cleaner and a controlling method thereof, and more particularly, to a robot cleaner and a traveling algorithm of the robot cleaner having an improved structure.

BACKGROUND ART

A robot cleaner is a device that automatically cleans a cleaning space by suctioning foreign matter, such as dust accumulated on a floor while running in the cleaning space without a user's manipulation. That is, the robot cleaner cleans the cleaning space while running in the cleaning space.

The robot cleaner generally cleans automatically according to a planned route inside the robot cleaner regardless of the user's intention. When the robot cleaner senses an obstacle while running in the cleaning space, the robot cleaner generates a path to avoid the obstacle, and runs in the cleaning space by avoiding the obstacle.

In order to avoid obstacles, the robot cleaner repeats an operation for avoiding obstacles according to a predetermined driving pattern, which causes a delay in the cleaning time or increases battery consumption of the robot cleaner.

Therefore, in recent years, there has been an increasing need for a robot cleaner capable of effectively avoiding obstacles located in a running cleaning space and performing efficient cleaning.

DISCLOSURE

Technical Problem

One aspect provides a cleaner with an improved degree of freedom of movement.

Another aspect provides a cleaner with improved cleaning performance.

Technical Solution

In accordance with an aspect of the disclosure, a robot cleaner includes a brush unit having a suction flow path; a body unit configured to have a driving device, and be coupled to the brush unit to be rotatable relative to the brush unit; and a redirection device configured to rotate the body unit relative to the brush unit, and the redirection device includes a rotation guide extending along an inner circumferential surface of the brush unit; a rotation driving source disposed in the body unit and generating power; and a power transmission member which moves along the rotation guide by the power transmitted from the rotation driving source and rotates the body unit with respect to the brush unit.

The power transmission member may include a first gear connected to the rotation driving source; and a second gear that rotates by receiving power from the first gear and moves along the rotation guide.

The rotation guide may continuously form along an inner circumferential direction of the brush unit.

The body unit may include a dust collecting path for guiding foreign matter to a dust collecting device, and wherein the suction flow path and the dust collecting path may be formed between the inner circumferential surface of the brush unit and an outer circumferential surface of the brush unit and may be connected by a connection flow path extending along a circumferential direction of the body unit.

The body unit may include a first flow path former continuously extending along an outer circumferential surface of the body unit to form an inner side of the connection flow path, and the brush unit may include a second flow path former extending along the inner circumferential surface of the brush unit to from an outer side of the connection flow path and coupled with the first flow path former.

The brush unit may include a guide portion extending along a rotation direction of the body unit to guide the rotation of the body unit.

In accordance with another aspect of the disclosure, a robot cleaner includes a brush unit having a suction flow path; a body unit coupled with the brush unit to be rotatable relative to the brush unit; a sensor configured to detect an obstacle; and a controller configured to change a driving direction of the robot cleaner by rotating the body unit when the sensor detects the obstacle.

The controller may rotate the body unit in a direction in which the obstacle is not detected by the sensor when the sensor detects the obstacle.

The controller may rotate the body unit at a predetermined angle when the sensor detects the obstacle, and may determine whether another obstacle is detected by the sensor after the rotation of the body unit is completed.

The controller may control the robot cleaner to drive when no obstacle is detected by the sensor after changing the driving direction of the robot cleaner by rotating the body unit.

The controller may rotate the body unit into a direction in which the obstacle is not detected by the sensor when the obstacle is detected by the sensor after changing the driving direction of the robot cleaner by rotating the body unit.

The controller may rotate the body unit by 90° based on the driving direction to control the robot cleaner to travel in a direction perpendicular to the driving direction without rotating the brush unit.

The controller may rotate the body unit by 180° based on the driving direction to control the robot cleaner to travel in a direction opposite to the driving direction without rotating the brush unit.

The controller may rotate the body unit by 360° without rotating the brush unit.

The sensor may be provided in the body unit.

In accordance with another aspect of the disclosure, a robot cleaner controlling method includes controlling driving of the robot cleaner; detecting an obstacle; changing a driving direction of the robot cleaner by rotating a body unit of the robot cleaner when the obstacle is detected, and controlling the robot cleaner to drive when the obstacle is not detected after the driving direction is changed.

Rotating the body unit of the robot cleaner may include, rotating the body unit of the robot cleaner in a direction in which the obstacle is not detected when the obstacle is detected.

Rotating the body unit of the robot cleaner may include rotating the body unit of the robot cleaner at a predetermined angle when the obstacle is detected, and may further include determining whether another obstacle is detected after the rotation of the body unit is completed.

Rotating the body unit of the robot cleaner may include rotating the body unit into a direction in which the obstacle is not detected when the obstacle is detected by a sensor after changing the driving direction of the robot cleaner.

Rotating the body unit of the robot cleaner may include rotating the body unit by 90° based on the driving direction to control the robot cleaner to travel in a direction perpendicular to the driving direction without rotating the brush unit.

Rotating the body unit of the robot cleaner may include rotating the body unit by 180° based on the driving direction to control the robot cleaner to travel in a direction opposite to the driving direction without rotating the brush unit.

Rotating the body unit of the robot cleaner may include rotating the body unit by 360° without rotating the brush unit.

Advantageous Effects

According to the above disclosure, since the driving unit is rotatably configured with respect to the brush unit, the degree of freedom of movement may be improved. In addition, a cleaner according to an embodiment may improve the cleaning performance as the degree of freedom of movement is improved.

MODE FOR INVENTION

Figure 1:
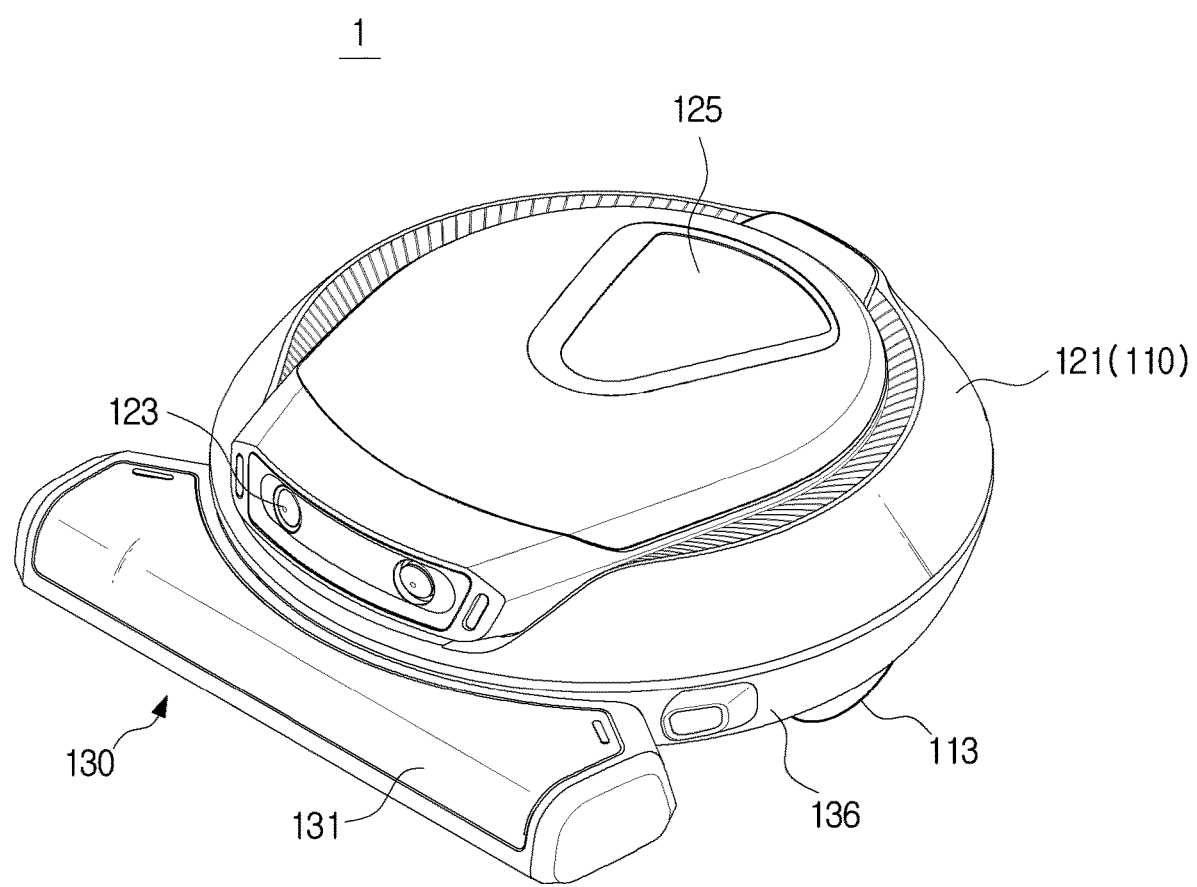
FIG. 1 is a perspective view of a robot cleaner according to an embodiment of the present invention.

Configurations shown in the embodiments and drawings described herein are only exemplary embodiments of the disclosed invention. There may be various modifications that can replace the embodiments and drawings of the present specification at the time of filing of the present application.

In addition, the same reference numerals or signs in each of the drawings of the present specification represent parts or components that perform substantially the same function.

Also, the terminology used herein is for the purpose of describing particular embodiments only and is not intended to be limiting and/or restricting the disclosed invention. Singular expressions include plural expressions unless the context clearly indicates otherwise. In this specification, the terms "comprise" and "have" are intended to indicate that there is a feature, number, step, action, component, part, or combination thereof described in the specification, and one or more other features. It does not exclude in advance the possibility of the presence or the addition of numbers, steps, operations, components, parts or combinations thereof.

In addition, the terms including ordinal numbers such as "first" and "second" as used herein may be used to describe various components, but the components are not limited by the terms. The terms are used only to distinguish one component from another. For example, without departing from the scope of the present invention, a first component may be referred to as a second component, and similarly, the second component may also be referred to as the first component. The term "and/or" includes any combination of a plurality of related items or any of a plurality of related items.

Meanwhile, the terms "front," "rear," "upper," "lower," "left" and "right" used in the following description are defined on the basis of the drawings, and according to the terms, the shape of each component and position are not limited.

Hereinafter, embodiments of the disclosure will be described in detail with reference to the accompanying drawings.

The front and front used below refer to front and front facing directions relative to a robot cleaner 1 shown in FIG. 1, and rear refers to a rear facing direction of the robot cleaner 1.

Figure 2:
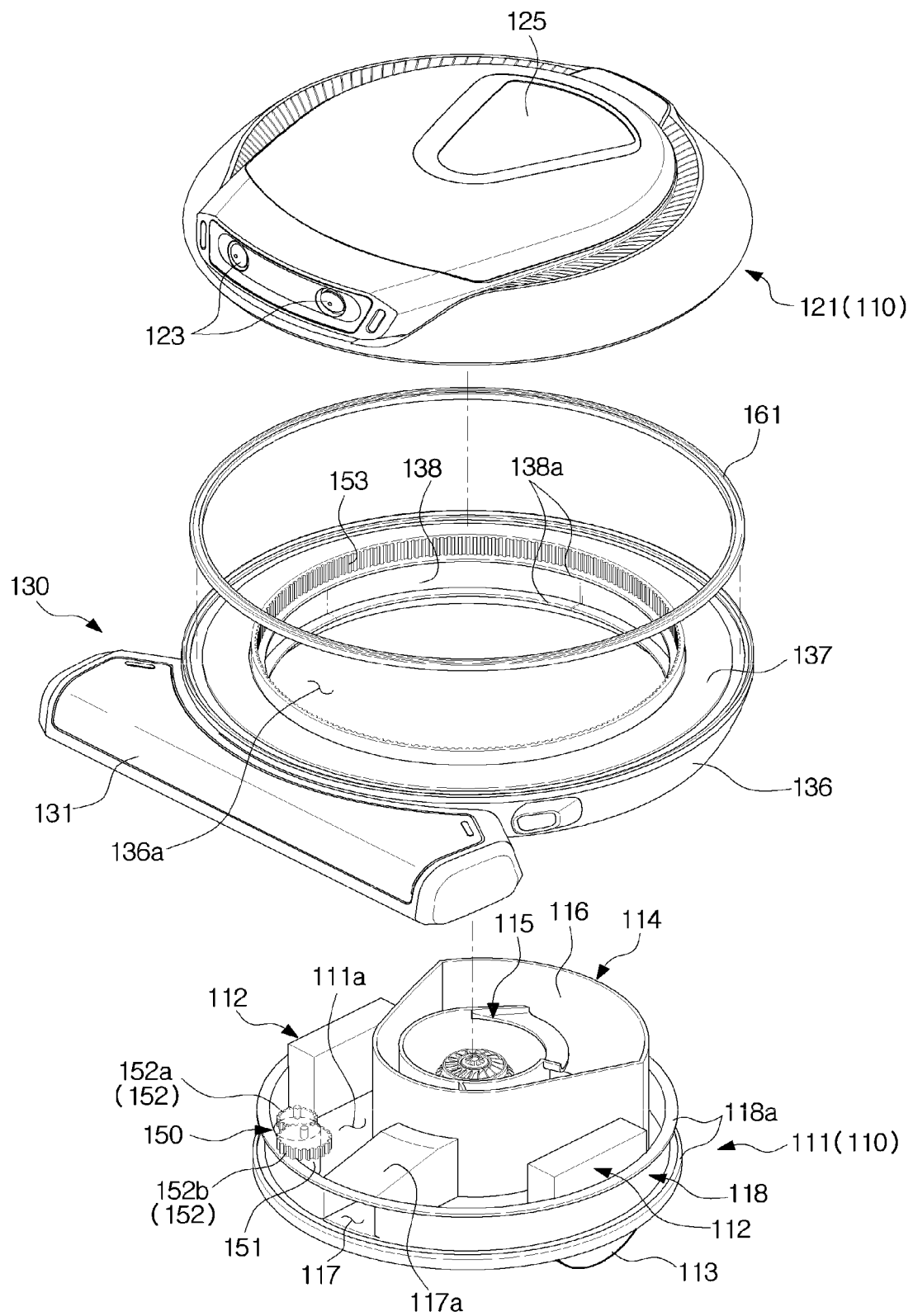
FIG. 2 is an exploded perspective view of a part of the robot cleaner shown in FIG. 1.

FIG. 1 is a perspective view of a robot cleaner according to an embodiment of the present invention. FIG. 2 is an exploded perspective view of a part of the robot cleaner shown in FIG. 1.

Referring to FIGS. 1 and 2, the robot cleaner 1 according to an embodiment will be described.

The robot cleaner 1 may include a body unit 110, a brush unit 130, and a redirection device 150.

The body unit 110 may include a driving device 112, a main body 111 accommodating a dust collecting device 114 therein, and a cover 121 covering an upper surface of the main body 111. The body unit 110 may be configured to be rotatable relative to the brush unit 130.

The main body 111 may have a space 111*a* in which the dust collecting device 114 is accommodated. The main body 111 may include a dust flow path 117 that directs air containing foreign matter such as dust sucked from the brush unit 130 to the dust collecting device 114. The main body 111 may include a flow path partition 117*a* forming the dust flow path 117.

The driving device 112 may include a wheel 113 provided to allow the main body 111 to drive in a cleaning space. The driving device 112 may include a driving source (not shown) for rotating the wheel 113. The wheel 113 may be arranged to protrude downward from the bottom of the main body 111. The wheels 113 may be provided on the left and right of the bottom of the main body 111, respectively.

The dust collecting device 114 may be housed inside the main body 111. The dust collecting device 114 may include a suction motor 115 that provides power for sucking dust and a dust collector 116 that stores suctioned dust. The air including the foreign matter sucked from the brush unit 130 may be introduced into the dust collecting device 114 through the dust flow path 117.

The main body 111 may be formed in a substantially circular shape to be rotatable about the brush unit 130. The main body 111 may include a first flow path former 118 extending along an outer circumferential surface. The first flow path former 118 may form a connection flow path 148 together with a second flow path former 138 of the brush unit 130. The first flow path former 118 may form an inner side of the connection flow path 148, and the second flow path former 138 may form an outer side of the connection flow path 148. The connection flow path 148 will be described in detail later.

The first flow path former 118 may include a first coupling part 118*a* coupled with a second coupling part 138*a* of the second flow path former 138. The first coupling part 118*a* may protrude from a portion of the first flow path former 118 that forms the inner side of the connection flow path 148. The first coupling part 118*a* may form upper and lower surfaces of the connection flow path 148 together with the second coupling part 138a. The first coupling part 118a may extend along the outer circumference of the main body 111.

The cover 121 may cover a top surface of the main body 111. In detail, the cover 121 may cover the top surface of the main body 111 coupled with the brush unit 130. That is, the cover 121 may cover the top surface of the main body 111 as it is coupled to an upper portion of the brush unit 130. The cover 121 may be formed in a substantially circular shape so as to be rotatable with respect to the brush unit 130.

The cover 121 may include a sensor 123 for detecting an obstacle. The sensor 123 may be arranged to sense the front of the driving device 112 in a driving direction. As will be described later, the robot cleaner 1 according to an embodiment is provided so that the body unit 110 is rotatable with respect to the brush unit 130, even if the brush unit 130 is located at the side or the rear of the body unit 110. Since it can move, even if the sensor 123 is provided only in the front, it is possible to efficiently run in the cleaning space.

The cover 121 may include a dust checking unit 125 provided to check the dust collected in the dust collecting device 114. The dust checking unit 125 may be formed to be transparent to see the inside of the dust collecting device 114 in a state where the cover 121 is not opened.

The brush unit 130 may include a brush unit 131 for sucking dust from a bottom surface and a base unit 136 rotatably coupled to the body unit 110.

The brush unit 131 may include a roller 132 rotatably mounted therein and a brush 133 provided on an outer circumferential surface of the roller 132. As the roller 132 rotates, the brush 133 may sweep the foreign matter on the bottom surface into a suction flow path 131a.

The base unit 136 may form a lower portion of an outer surface of the robot cleaner 1. The base unit 136 may be formed in a substantially circular shape having a space 136a into which the main body 111 can be inserted. That is, the base unit 136 may have a donut shape. A cover coupling part 137 to which the cover 121 is rotatably coupled may be provided at an upper portion of the base unit 136. The cover coupling part 137 may extend along the circumference of the base unit 136. The cover 121 may rotate with respect to the base unit 136 as the redirection device 150 is operated while being rotatably coupled to the cover coupling part 137.

The robot cleaner 1 may include a guide unit 161 extending along a rotation direction of the body unit to guide the rotation of the body unit 110. In FIG. 2, the guide unit 161 is illustrated as being separately formed from the brush unit 130, but the guide unit 161 may be integrally formed with the brush unit 131. The guide unit 161 may be elastic. Accordingly, the cover 121 may be detachably mounted to the guide unit 161 in a rotatable state.

The base unit 136 may include the second flow path former 138 that forms the connection flow path 148 together with the first flow path former 118. The second flow path former 138 may extend along an inner circumferential surface of the base unit 136.

The second flow path former 138 may include the second coupling part 138a coupled with the first coupling part 118a. The second coupling part 138a may protrude inward from the second flow path former 138, which forms an outer side of the connection flow path 148. The second coupling part 138a may form the upper and lower surfaces of the connection flow path 148 together with the first coupling part 118a.

That is, the connection flow path 148 is formed between an inner circumferential surface of the brush unit 130 and an outer circumferential surface of the body unit 110 to connect the suction flow path 131a and the dust flow path 117 and extend along a circumferential direction of the body unit 110.

According to this configuration, even though the body unit 110 rotates with respect to the brush unit 130, the suction flow path 131a of the brush unit 130 and the dust flow path 117 of the body unit 110 may continue to communicate.

The robot cleaner 1 may include the redirection device 150 configured to rotate the body unit 110 relative to the brush unit 130. The redirection device 150 may include a rotation driving source 151, a power transmission member 152, and a rotation guide 153.

The rotation driving source 151 may be disposed inside the main body 111. The rotation driving source 151 may include a motor. The rotation driving source 151 may generate power for rotating the body unit 110 with respect to the brush unit 130.

The power transmission member 152 may transmit power generated from the rotation driving source 151 to the rotation guide 153 disposed in the brush unit 130. The power transmission member 152 may move along the rotation guide 153 by the power transmitted from the rotation driving source 151. Accordingly, the body unit 110 in which the power transmission member 152 is disposed may rotate with respect to the brush unit 130.

The power transmission member 152 may include one or more gears. In detail, the power transmission member 152 may include a first gear 152a connected to the rotation driving source 151 and a second gear 152b connecting the first gear 152a and the rotation guide 153.

The first gear 152a may be connected to the rotation driving source 151.

The second gear 152b may rotate while receiving power from the first gear 152a and move along the rotation guide 153.

The second gear 152b may have a different size from that of the first gear 152a and may adjust the rotation speed of the body unit 110 according to a gear ratio difference. Specifically, the second gear 152b may be provided to have a diameter larger than that of the first gear 152a so that the body unit 110 may be configured to rotate at a speed slower than the rotation speed of the rotation driving source 151.

Alternatively, the second gear 152b may be omitted, and in this case, the first gear 152a may be directly connected to the rotation guide 153.

The rotation guide 153 may extend along the inner circumferential surface of the base unit 136 of the brush unit 130. The rotation guide 153 may be continuously formed along the inner circumferential surface of the brush unit 130. The rotation guide 153 may have a thread shape continuously formed along the inner circumferential surface of the base unit 136.

According to this configuration, when the redirection device 150 is driven, the body unit 110 may rotate relative to the brush unit 130.

Figure 3:
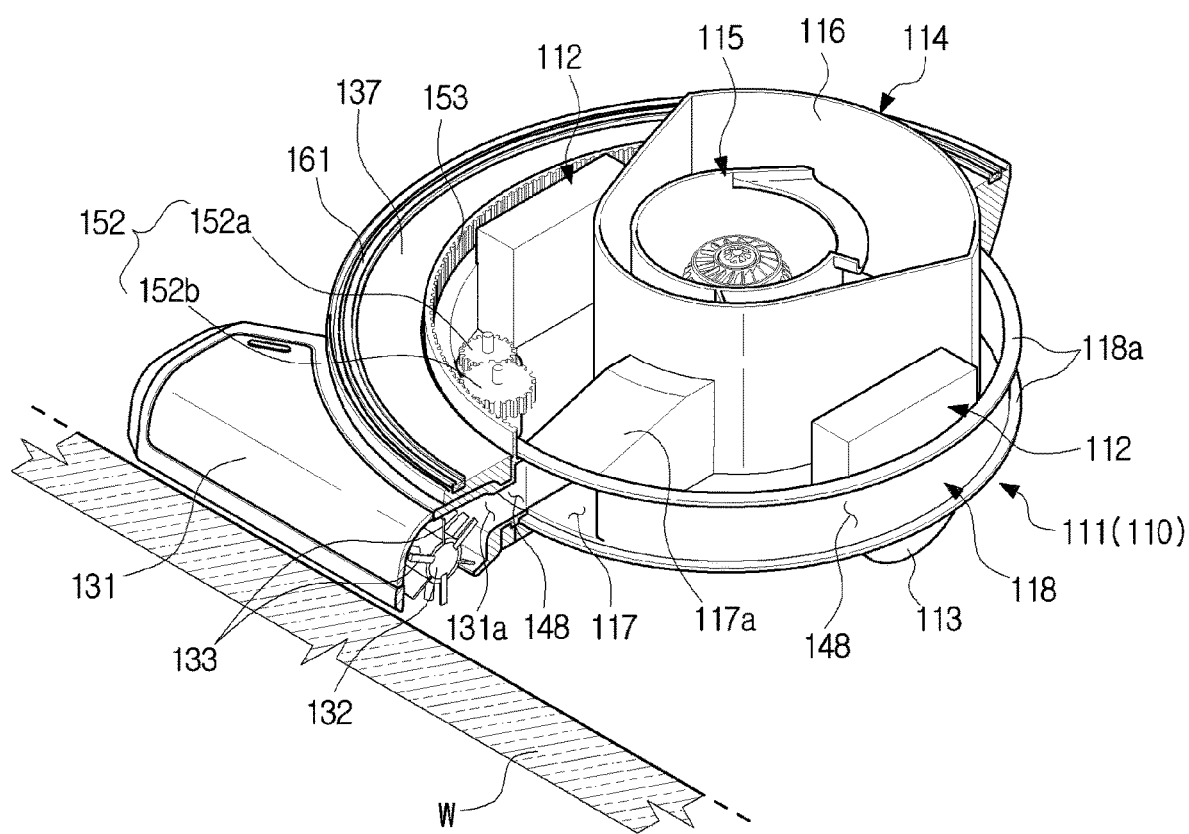
FIGS. 3 and 4 are views illustrating an operation in which a body unit of the robot cleaner shown in FIG. 1 rotates with respect to a brush unit by a redirection device.
Figure 4:
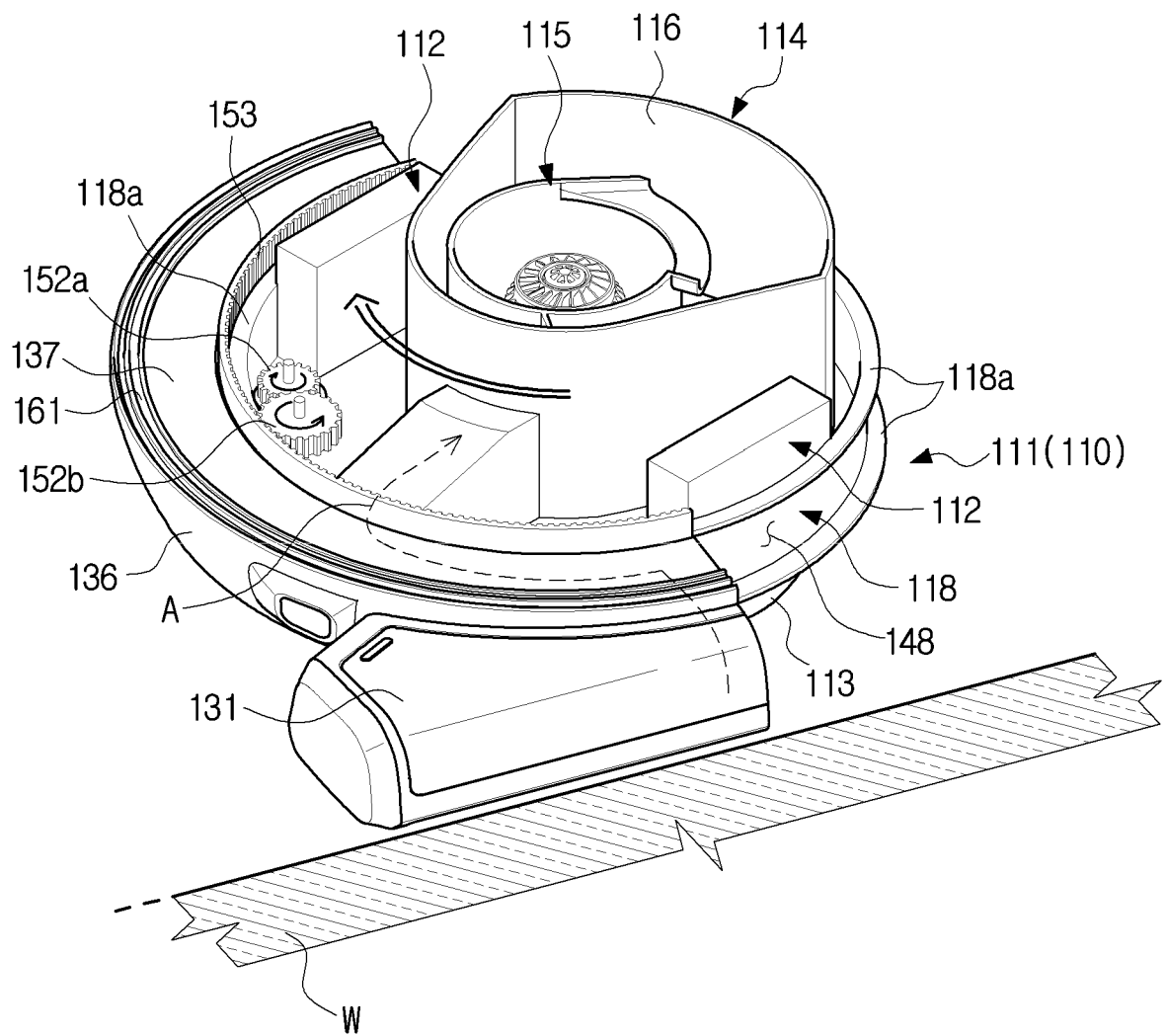

FIGS. 3 and 4 are views illustrating an operation in which a body unit of the robot cleaner shown in FIG. 1 rotates with respect to a brush unit by a redirection device.

FIGS. 3 and 4 describe the operation of the robot cleaner 1 according to an embodiment of the present invention.

Referring to FIG. 3, the robot cleaner 1 may meet a wall W while traveling forward. At this time, the robot cleaner 1 may change the driving direction to the left or right after the brush unit 130 and the body unit 110 retreat together. The robot cleaner 1 according to an embodiment may be driven to more effectively clean a bottom surface adjacent to the wall W by rotating only the body unit to the left or right with the brush unit 130 in close contact with the wall W.

Specifically, when the brush unit 130 of the robot cleaner 1 is in close contact with the wall W, the rotation driving source 151 of the redirection device 150 may generate power. The power generated from the rotation driving source 151 may rotate the power transmission member 152.

Specifically, referring to FIG. 4, when the body unit 110 of the robot cleaner 1 is to be rotated to the right with respect to the brush unit 130, the rotation driving source 151 may rotate the first gear 152*a* in a clockwise direction. As the first gear 152*a* rotates clockwise, the second gear 152*b* may rotate counterclockwise. The second gear 152*b* rotates counterclockwise and may move clockwise along the rotation guide 153. At this time, since the second gear 152*b* is fixed to the body unit 110, the body unit 110 may rotate clockwise together with the second gear 152*b*.

Although not shown, when the body unit 110 of the robot cleaner 1 is to be rotated to the left with respect to the brush unit 130, the rotation driving source 151 rotates the first gear 152*a* in a counterclockwise direction. Accordingly, the second gear 152*b* may rotate in the clockwise direction. Accordingly, the body unit 110 may rotate in the counterclockwise direction.

In this case, since the connection flow path 148 extends along the rotation direction of the body unit 110, the suction flow path 131*a* and the dust flow path 117 may continue to communicate. The air introduced through the brush unit 131 may be guided through the suction flow path 131*a*, the connection flow path 148, and the dust flow path 117 sequentially (direction A) to the dust collecting device 114.

Figure 5:
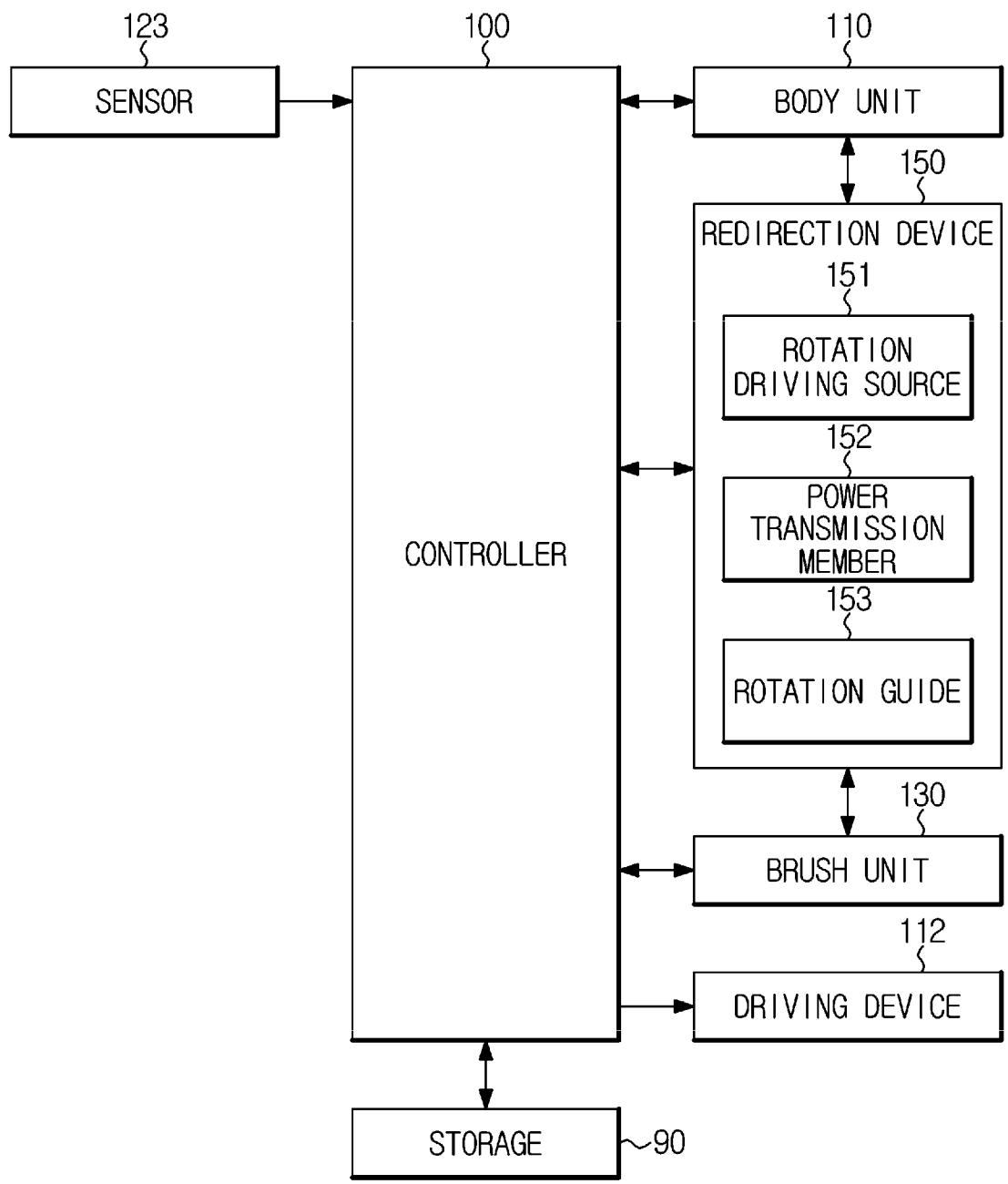
FIG. 5 is a control block diagram of a robot cleaner according to an embodiment.

FIG. 5 is a control block diagram of a robot cleaner according to an embodiment. FIGS. 6 to 10 are views illustrating a driving form of a robot cleaner according to an embodiment.

Referring to FIG. 5, the robot cleaner 1 according to an embodiment includes a storage 90 for storing data related to the control of the robot cleaner 1, a controller 100 for controlling each component of the robot cleaner 1, and the sensor 123 for detecting an obstacle during the driving of the robot cleaner 1.

The sensor 123 may be provided in the body unit 110 of the robot cleaner 1, and may be provided in the cover 121 covering an upper surface of the main body 111 so as to sense a forward direction according to the driving direction of the driving device 112.

The sensor 123 may detect an object or obstacle located on the driving path of the robot cleaner 1 from the front or the side. The position where the sensor 123 is provided is only one embodiment, and there is no limitation on the position where the sensor 123 is provided or the number of the sensors 123.

In addition, various types of the sensors 123 may exist, such as a motion sensor, an image sensor, an infrared sensor, a radio wave sensor, and a 3D sensor. The presence of the obstacle may be recognized by sensing a certain distance from the obstacle located in the driving path of the robot cleaner 1. Furthermore, the motion sensor may recognize a movement of the moving obstacle, obtain a three-dimensional shape of the obstacle, and the image sensor may also acquire the shape of the obstacle. The infrared sensor or the radio wave sensor may transmit infrared rays or radio waves to an object to measure the distance to the obstacle, and when a plurality of the sensors 123 are provided, the shape and position of the obstacle in two dimensions and three dimensions as well as the distance in one dimension can also be detected. The 3D sensor can also recognize the distance from the obstacle and the three-dimensional shape of the obstacle.

When the plurality of sensors 123 capable of recognizing the distance and the shape in one dimension are provided, two-dimensional and three-dimensional shapes can be detected, so that two-dimensional and three-dimensional obstacles can be detected according to the type and number of the sensors 123. As illustrated in FIGS. 6 to 10, the sensor 123 may move to detect and avoid obstacles on a path on which the robot cleaner 1 travels.

The storage 90 may store a control program and control data for controlling the robot cleaner 1 and map information of a cleaning space acquired by the robot cleaner 1 while driving. In addition, the storage 90 may store data about a moving path by avoiding a movement limit direction or an obstacle of the robot cleaner 1 sensed by the sensor 123 on the driving path of the robot cleaner 1.

When the robot cleaner 1 rotates the body unit 110 to travel by avoiding obstacles on the driving path, the storage 90 may store data about an angle at which the body unit 110 rotates.

The storage 90 may operate as an auxiliary storage device that assists a memory included in the controller 100, which will be described later. The storage 90 may be configured as a nonvolatile storage medium in which the stored data is not destroyed even when the power is cut off.

The storage 90 may include a semiconductor device drive that stores data in a semiconductor device, a magnetic disk drive that stores data on a magnetic disk, and the like.

The controller 100 collectively controls the operation of the robot cleaner 1. Regarding the operation control of the robot cleaner 1 by the controller 100, a driving algorithm in which the robot cleaner 1 according to the embodiment avoids obstacles will be described with reference to FIGS. 6 to 10.

The controller 100 collectively controls the operation of the robot cleaner 1.

Regarding the operation control of the robot cleaner 1 by the controller 100, a driving algorithm in which the robot cleaner 1 according to the embodiment avoids obstacles will be described with reference to FIGS. 6 to 10.

Figure 6:
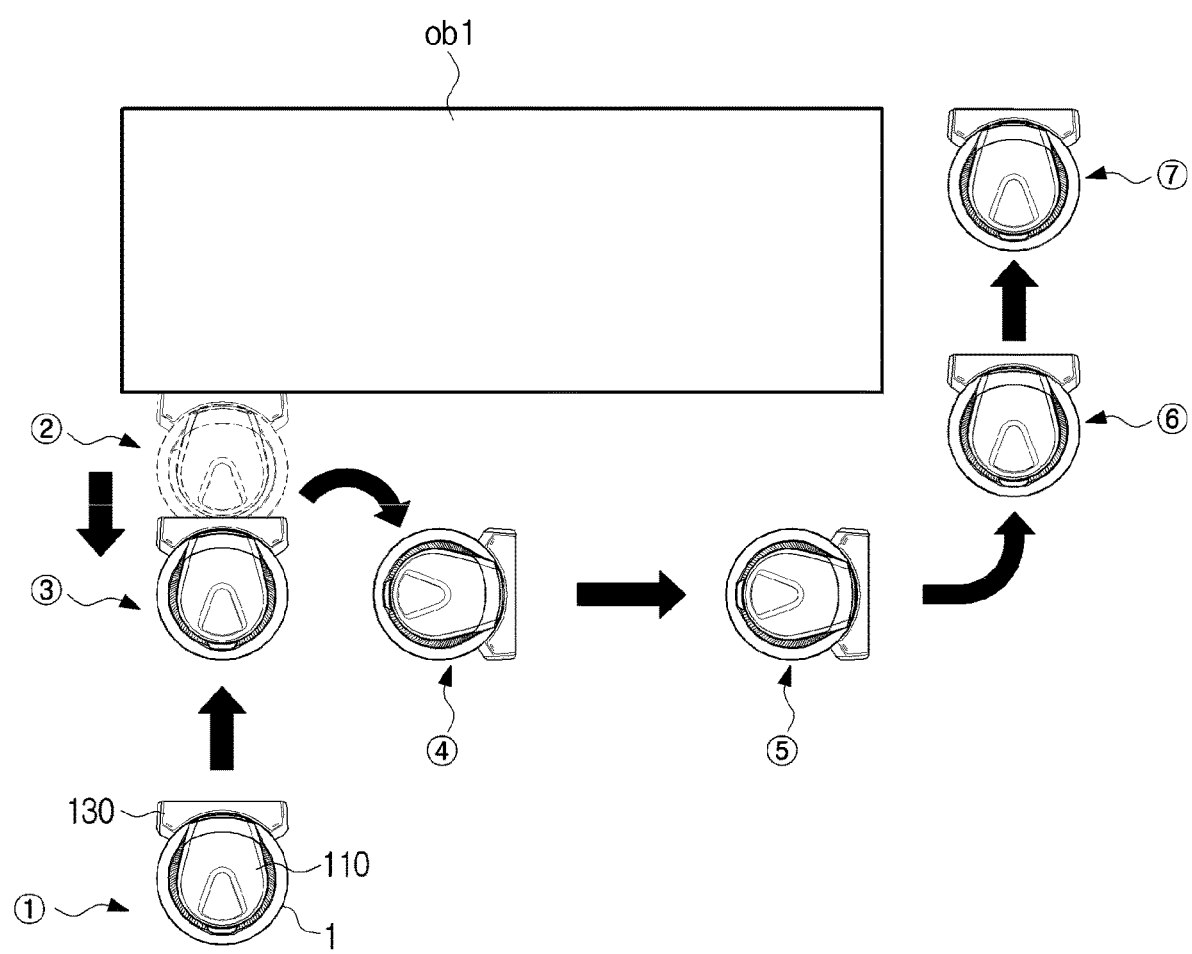
FIGS. 6 to 10 are views illustrating a driving form of a robot cleaner according to an embodiment.

Referring to FIG. 6, when the robot cleaner 1 detects an obstacle ob1 while driving in a cleaning space, the robot cleaner 1 may generate an avoidance path.

As shown in FIG. 6, the robot cleaner 1 may start traveling from position ① and the obstacle ob1 may be detected by the sensor 123 while driving in the cleaning space. When the robot cleaner 1 reaches position ②, the robot cleaner 1 encounters the obstacle ob1 and cannot travel anymore, so the robot cleaner 1 must travel to avoid the obstacle ob1. In addition, the robot cleaner 1 may start driving at the position ① and detect the obstacle ob1 at position ③, and it can be determined that should be changed by detecting the distance to the obstacle ob1 to travel in the driving path before encountering the obstacle ob1.

The controller 100 may rotate the body unit 110 and the brush unit 130 of the robot cleaner 1 to change the driving path of the robot cleaner 1.

When the robot cleaner 1 is located at the position ②, the controller 100 may control the driving device 112 of the robot cleaner 1 to control the robot cleaner 1 to move backward to the position ③.

When the robot cleaner 1 is in the position ③, the traveling path of the robot cleaner 1 may be changed to the right by rotating the body unit 110 and the brush unit 130 to the right. That is, the controller 100 may control the redirection device 150 of the robot cleaner 1 not to operate and the driving device 112 to operate to control the body unit 110 and the brush unit 130 to rotate together.

As shown in FIG. 6, when the body unit 110 and the brush unit 130 of the robot cleaner 1 rotate together to the right, the traveling path of the robot cleaner 1 may change from position ④ to the right.

On the other hand, when the robot cleaner 1 starts driving at the position ① and detects the obstacle ob1 at the position ③, the controller 100 may operate the body unit 110 and the brush unit 130 at the position ③ in the same manner as described above, and a control signal for rotating together to the right side can be transmitted and the traveling path of the robot cleaner 1 can be changed to the right by the control signal.

After the robot cleaner 1 travels from the position ④ to position ⑤, the controller 100 may determine that the robot cleaner 1 is out of the region where the obstacle ob1 is present, and the driving path of the robot cleaner 1 may be changed to the left side based on the predetermined cleaning driving path.

That is, when the robot cleaner 1 is in the position ⑤, the traveling path of the robot cleaner 1 may be changed to the left by rotating the body unit 110 and the brush unit 130 to the left. That is, the controller 100 may control the redirection device 150 of the robot cleaner 1 not to operate and control the driving device 112 to operate the body unit 110 and the brush unit 130 to rotate together.

As shown in FIG. 6, when the body unit 110 and the brush unit 130 of the robot cleaner 1 rotate together to the left side and the driving path of the robot cleaner 1 is changed, the robot cleaner 1 travels from position ⑥ to position ⑦.

As shown in FIG. 6, the robot cleaner 1 may avoid the obstacle ob1 by rotating the body unit 110 and the brush unit 130 together according to the control of the driving device 112 by the controller 100. Since the body unit 110 and the brush unit 130 need to rotate together, the driving operation is restricted, and unnecessary driving operation may be repeated to change the direction.

Figure 7:
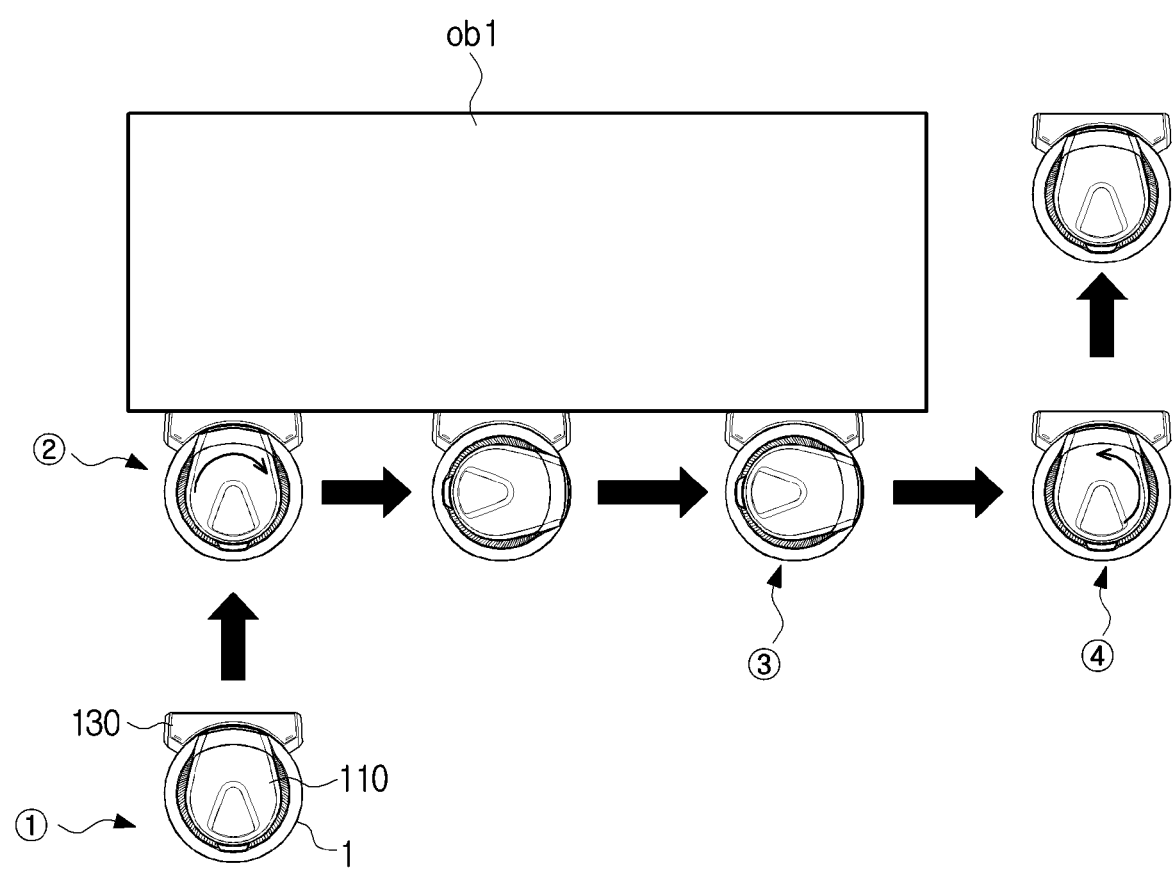

Referring to FIG. 7, when the robot cleaner 1 detects the obstacle ob1 while driving in a cleaning space, the robot cleaner 1 rotates only the body unit 110 without rotating the brush unit 130 unlike in FIG. 6 and can change the driving direction of the robot cleaner 1.

As shown in FIG. 7, the robot cleaner 1 may start driving from the position ① and the sensor 123 may detect the obstacle ob1 while driving in the cleaning space, and deliver the detected data about the obstacle ob1 to the controller 100.

When the robot cleaner 1 reaches the position ②, the robot cleaner 1 must travel to avoid the obstacle ob1 because it can no longer travel due to the obstacle ob1. In this case, when the body unit 110 does not rotate independently of the brush unit 130, the body unit 110 and the brush unit 130 should be rotated together. Therefore, the controller 100 must send a control signal to change the driving direction to the right before the robot cleaner 1 reaches the position ②.

However, according to the robot cleaner 1 according to the embodiment, since the body unit 110 may rotate independently of the brush unit 130, even when the robot cleaner 1 reaches the position ② and the brush unit 130 is in close contact with the obstacle ob1 in a parallel direction, the driving direction of the robot cleaner 1 may be changed.

In detail, the controller 100 may transmit a control signal for changing the driving direction of the robot cleaner 1 by rotating the body unit 110 based on the result of detecting the obstacle ob1 by the sensor 123.

The control signal sent by the controller 100 may control the body unit 110 to rotate independently of the brush unit 130 by controlling the redirection device 150 provided to rotate the body unit 110 with respect to the brush unit 130.

Referring to FIG. 7, the controller 100 is the brush unit 130 of the robot cleaner 1 closely adhered in a direction parallel to the obstacle ob1, and thus does not rotate while being fixed. Only the body unit 110 may be rotated 90° clockwise. A detailed operation of rotating the body unit 110 independently of the brush unit 130 according to the control of the redirection device 150 by the controller 100 is described above with reference to FIGS. 3 and 4, and thus redundant description thereof will be omitted.

In FIG. 7, the body unit 110 is rotated by 90° as an example, but the angle at which the body unit 110 is rotated may vary according to a predetermined set value. In addition, after the body unit 110 rotates, the controller 100 may control the body unit 110 to further rotate in a direction in which the obstacle is not detected according to the obstacle detection result of the sensor 123.

That is, the controller 100 controls the redirection device 150 to rotate the body unit 110 at a predetermined angle, and after the rotation of the body unit 110 is completed, determines whether an obstacle is detected by the sensor 123 provided in the body unit 110.

As shown in FIG. 7, when the body unit 110 rotates 90° in a clockwise direction, the driving direction of the robot cleaner 1 may be changed to the right according to the direction of the wheel 113 of the driving device 112 rotated together with the body unit 110. The sensor 123 provided in the body unit 110 may detect the front of the changed driving direction of the robot cleaner 1.

After the rotation of the body unit 110 is completed, the controller 100 may control the robot cleaner 1 to travel along the changed driving direction when no obstacle is detected by the sensor 123.

Referring to FIG. 7, the robot cleaner 1 travels to the right while the brush unit 130 of the robot cleaner 1 is in close contact with the obstacle ob1 in the direction parallel to the obstacle ob1. Therefore, the cleaning of the area in close contact with the obstacle ob1 by a wide portion of the brush unit 130 can proceed effectively and lateral running of the robot cleaner 1 can be made.

When the robot cleaner 1 travels and reaches the position ③, the controller 100 may determine that the robot cleaner 1 is out of the region where the obstacle ob1 exists. The controller 100 may control the body unit 110 to rotate in the counterclockwise direction by controlling the redirection device 150 to change the driving path of the robot cleaner 1 to the left based on the predetermined cleaning driving path.

When the brush unit 130 of the robot cleaner 1 is fixed and the rotation of the body unit is completed in the counterclockwise direction, the robot cleaner 1 may travel in the direction in which the robot cleaner first started traveling at the position ①.

Figure 8:
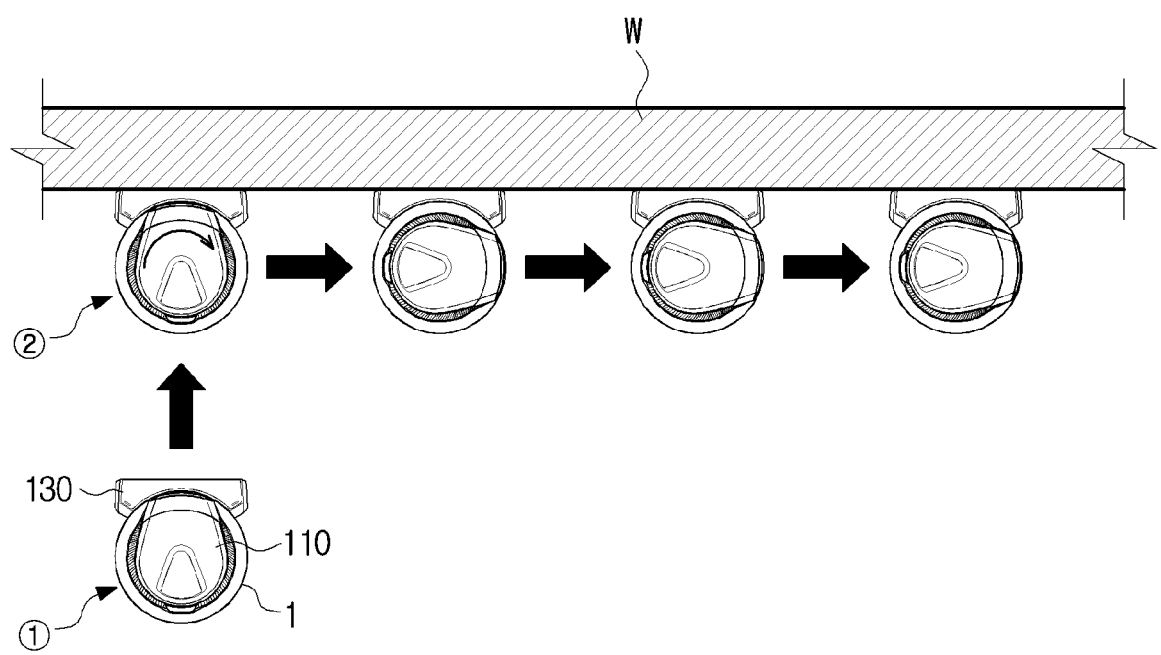

Referring to FIG. 8, the robot cleaner 1 according to an embodiment may detect the wall W while driving in the cleaning space. That is, the controller 100 may determine the obstacle recognized by the sensor 123 as the wall W when the width of the obstacle recognized by the sensor 123 is larger than a predetermined range.

Even when the obstacle detected by the sensor 123 is the wall W, as in FIG. 7, the controller 100 rotates only the body unit 110 without rotating the brush unit 130 of the robot cleaner 1 to change the traveling direction of the robot cleaner 1.

As shown in FIG. 8, when the robot cleaner 1 starts running at the ① position and reaches the ② position, the robot cleaner 1 encounters the wall W, so that the robot cleaner can no longer travel. Therefore, it is necessary to travel along the wall W or to travel along the wall W.

According to the robot cleaner 1 according to an embodiment, since the body unit 110 may rotate independently of the brush unit 130, even when the robot cleaner 1 reaches the position ② and the brush unit 130 is in close contact with the wall W, the driving direction of the robot cleaner 1 can be changed.

The controller 100 may rotate the body unit 110 to transmit a control signal for changing the driving direction of the robot cleaner 1, and the control signal sent by the controller 100 may be configured to rotate the body unit 110 with respect to the brush unit 130, and the controller 100 may control the body unit 110 to rotate independently with respect to the brush unit 130.

As shown in FIG. 8, when the body unit 110 rotates 90° in the clockwise direction, the driving direction of the robot cleaner 1 may be changed to the right according to the direction of the wheel 113 of the driving device 112 rotated together with the body unit 110. The sensor 123 provided in the body unit 110 may detect the front of the changed driving direction of the robot cleaner 1.

The brush unit 130 of the robot cleaner 1 is in close contact with the wall W in the direction parallel to the wall W, and the robot cleaner 1 travels to the right. Therefore, the cleaning of the area in close contact with the wall W to the wide part of the brush unit 130 can proceed effectively, and the lateral running of the robot cleaner 1 can be made.

Figure 9:
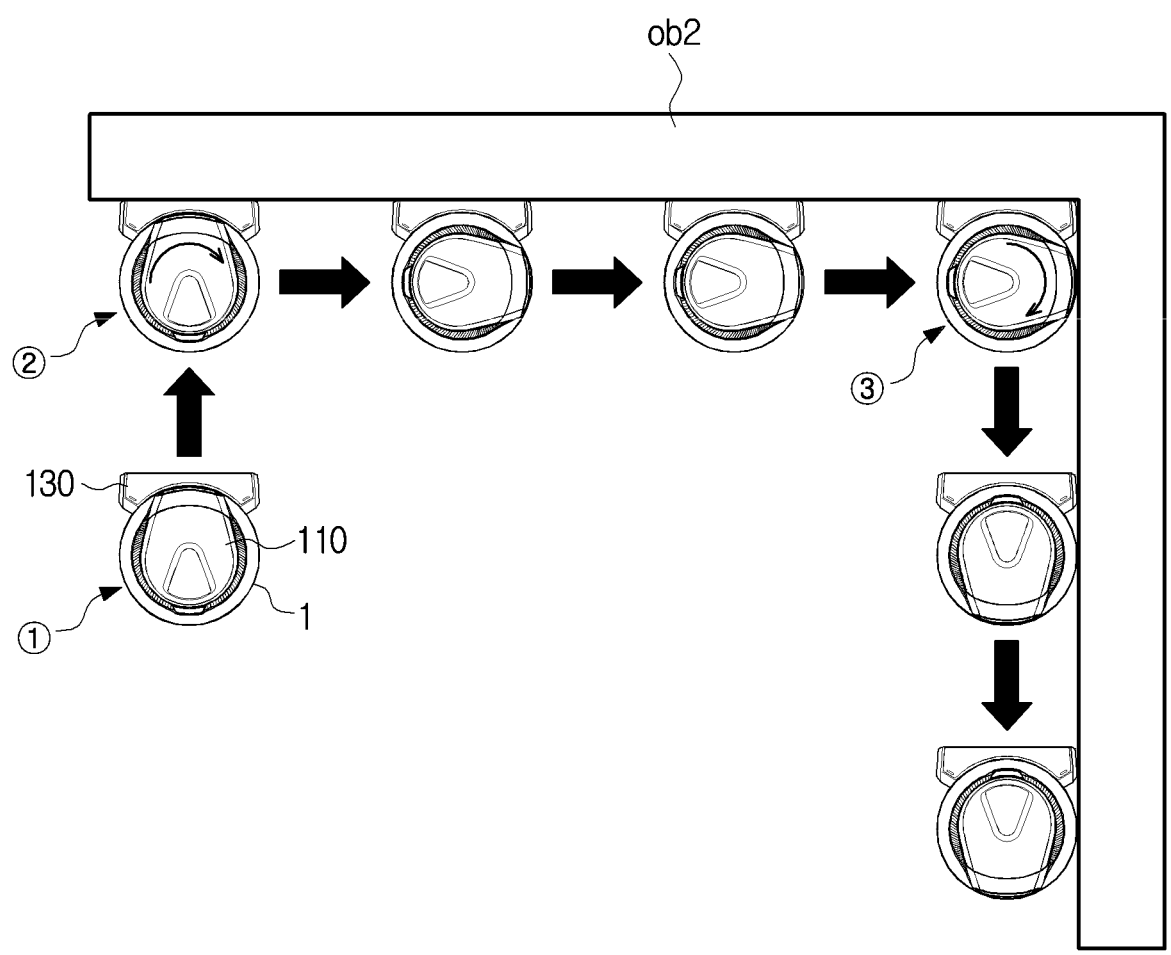

FIG. 9 illustrates that the robot cleaner 1 rotates the body unit 110 to change the driving direction when the robot cleaner 1 faces an obstacle ob2 different from those of FIGS. 6 and 7 while driving.

Referring to FIG. 9, the robot cleaner 1 according to an embodiment may detect various types of the obstacles ob2 while driving in the cleaning space. When the robot cleaner 1 according to an embodiment detects the obstacle ob2 while driving in the cleaning space, the robot cleaner 1 rotates only the body unit 110 without rotating the brush unit 130 unlike in FIG. 6 to change the driving direction of the robot cleaner 1.

As shown in FIG. 9, when the robot cleaner 1 starts traveling at the position ① and reaches the position ②, the robot cleaner 1 encounters the obstacle ob2 and avoids the obstacle ob2 since the driving is no longer possible. Therefore, the robot cleaner must avoid the obstacle ob2 or travel along the obstacle ob2.

The controller 100 may rotate the body unit 110 to transmit a control signal for changing the driving direction of the robot cleaner 1. The control signal sent by the controller 100 controls the redirection device 150 provided to rotate the body unit 110 with respect to the brush unit 130, and thus, the body unit 110 may be controlled to rotate independently with respect to the brush unit 130.

As shown in FIG. 9, when the body unit 110 rotates 90° in the clockwise direction, the driving direction of the robot cleaner 1 may be changed to the right according to the direction of the wheel 113 of the driving device 112 rotated together with the body unit 110. The sensor 123 provided in the body unit 110 may detect the front of the changed driving direction of the robot cleaner 1.

The brush unit 130 of the robot cleaner 1 is in close contact with the obstacle ob2 in the direction parallel to the obstacle ob2, and the robot cleaner 1 travels to the right. Therefore, the cleaning of the area that is in close contact with the obstacle ob2 by the wide portion of the brush unit 130 can proceed effectively and at the same time, the lateral running of the robot cleaner 1 can be made.

When the robot cleaner 1 travels to reach the position ③, the sensor 123 may detect the obstacle ob2 located in front of the driving direction. That is, the controller 100 may control the body unit 110 to rotate in a direction in which the obstacle ob2 is not detected according to the detection result of the obstacle ob2 by the sensor 123.

When the robot cleaner 1 is located at the position ③, when the body unit 110 rotates 90° counterclockwise, the obstacle ob2 is detected again by the sensor 123. Therefore, the controller 100 may control the body unit 110 to rotate 90° clockwise based on the result of detecting the obstacle ob2 by the sensor 123.

As shown in FIG. 9, when the robot cleaner 1 rotates 90° clockwise at the position ③, the robot cleaner 1 travels along the direction of the wheel 113 of the driving device 112 rotated together with the body unit 110 and changes the direction to the right. The sensor 123 may detect the forward direction of the changed driving direction of the robot cleaner 1.

When the robot cleaner 1 travels from the position ③, the brush unit 130 of the robot cleaner 1 moves the robot cleaner 1 while a narrow part is in close contact with the obstacle ob2, and the robot cleaner 1 can travel in the direction opposite to 180° from driving from the position ① to the position ②.

That is, when the driving direction of the robot cleaner 1 is changed at the position ③, the robot cleaner 1 may travel in the direction toward which the sensor 123 faces forward. As shown in FIG. 9, even when the robot cleaner 1 continuously encounters the obstacle ob2 while driving in the cleaning space, the body unit is independently of the brush unit 130 of the robot cleaner 1 under the control of the controller 100. Although the position and direction of the brush unit 130 are the same as the first, the running direction of the robot cleaner 1 may be freely changed.

Figure 10:
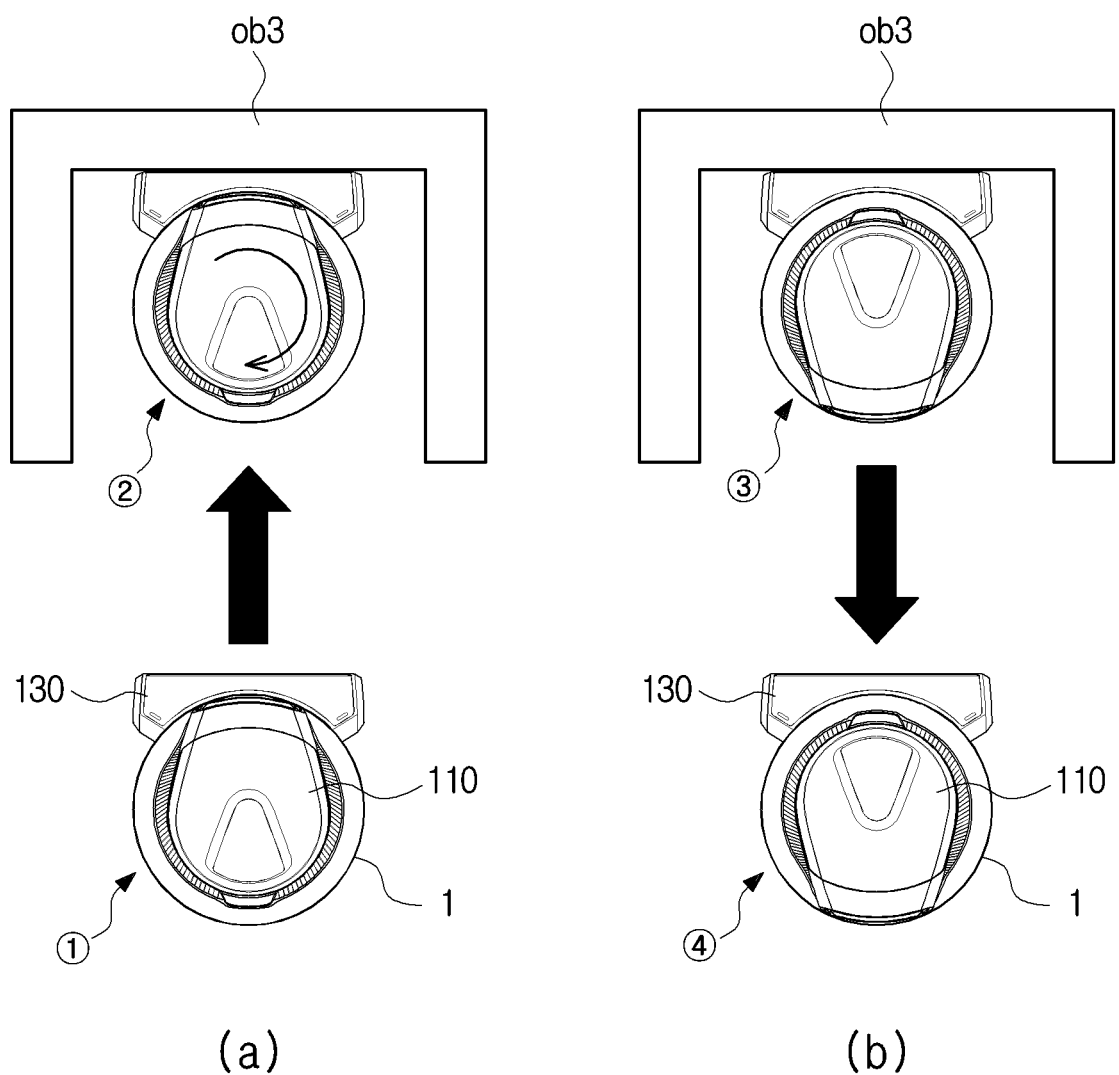

FIG. 10 illustrates that when the robot cleaner 1 faces an obstacle ob3 while driving, the controller 100 rotates the body unit 110 to change the driving direction of the robot cleaner 1.

Referring to FIG. 10(a), when the robot cleaner 1 according to an embodiment starts running at the position ① and reaches the position ②, the robot cleaner 1 encounters the obstacle ob3 and no longer travels. The vehicle must move to avoid the obstacle ob3.

According to the robot cleaner 1 according to an embodiment, since the body unit 110 may rotate independently of the brush unit 130, even when the robot cleaner 1 reaches the position ② and all three surfaces of the robot cleaner 1 are surrounded by the obstacle ob3, the robot cleaner 1 may change the driving direction.

That is, when the robot cleaner 1 is located at the position ②, the sensor 123 may detect the obstacle ob3 located in the forward direction of the driving direction, and the controller 100 may detect the obstacle ob3 by the sensor 123. As a result, the body unit 110 may be controlled to rotate in a direction in which the obstacle ob3 is not detected.

When the robot cleaner 1 is located at the position ②, the obstacle ob3 is detected again by the sensor 123 even when the body unit 110 rotates 90° clockwise or 90° counterclockwise. Therefore, the controller 100 may control the body unit 110 to rotate 180° based on the detection result of the obstacle ob3 by the sensor 123.

As shown in FIG. 10, when the robot cleaner 1 rotates 180° clockwise or counterclockwise at the position ②, the robot cleaner according to the direction of the wheel 113 of the driving device 112 rotated together with the body unit 110. The driving direction of the robot cleaner 1 may be changed to the opposite direction by 180° from the traveling direction of the robot cleaner 1 at the position ①. As shown in FIG. 10(*b*), the sensor 123 may detect the forward direction of the changed driving direction of the robot cleaner 1 at the position ③.

If the robot cleaner 1 does not detect an obstacle in front of the sensor 123 at the position ③, the controller 100 may control the robot cleaner 1 to travel, and the robot cleaner 1 may move from the position ③ to the position ④ to avoid the obstacle ob3.

As described in FIG. 10, when the robot cleaner 1 detects the obstacle ob3 while driving and cannot change the driving direction to the right or the left based on the driving direction, only the body unit 110 is rotated 180° for the first driving direction to run in the opposite direction.

That is, under the control of the controller 100, only the body unit 110 rotates independently of the brush unit 130 of the robot cleaner 1 so that the driving direction may be changed. Therefore, even if the position and the direction of the brush unit 130 are the same as the first, it is possible to freely change the driving direction of the robot cleaner 1 to perform the driving to avoid obstacles.

Although not shown in the drawing, the controller 100 may rotate the body unit 110 only 360° independently of the brush unit 130, and the body unit 110 of the robot cleaner 1 may rotate freely in all directions under the control of the controller 100.

Based on the rotation of the body unit 110, the driving device 112 may rotate as well, and the robot cleaner 1 may travel based on the changed driving route. In addition, the sensor 123 provided in the body unit 110 of the robot cleaner 1 may detect an obstacle in real time with respect to the driving direction of the robot cleaner 1.

Figure 11:
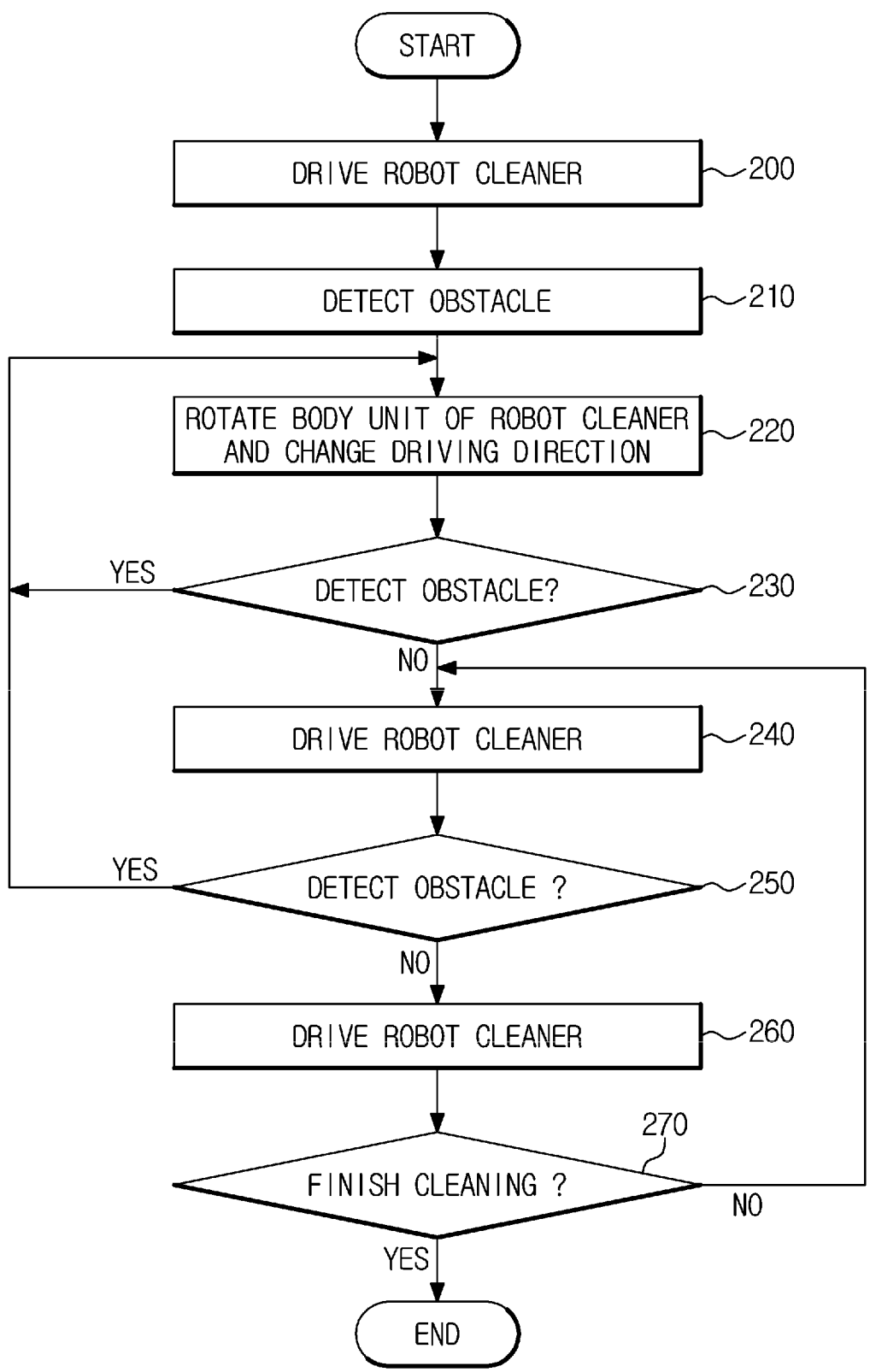
FIG. 11 is a flowchart illustrating a method of controlling a robot cleaner according to an embodiment.

FIG. 11 is a flowchart illustrating a method of controlling a robot cleaner according to an embodiment.

Referring to FIG. 11, the robot cleaner 1 may detect an obstacle through the sensor 123 provided in the body unit 110 while driving in the cleaning space (200) (210). Data detected by the sensor 123 about the obstacle may be transmitted to the controller 100, and the controller 100 may transmit a control signal for changing the driving direction of the robot cleaner 1 by rotating the body unit 110 based on the obstacle detection result of the sensor 123 (220).

That is, the control signal sent by the controller 100 may control the redirection device 150 provided to rotate the body unit 110 with respect to the brush unit 130, and control the body unit 110 to rotate independently with respect to the brush unit 130.

After the body unit 110 of the robot cleaner 1 rotates, the sensor 123 may detect whether there is an obstacle in front of the direction in which the body unit 110 rotates (230). As a result of the detection, when an obstacle is detected in the driving direction of the robot cleaner 1, the controller 100 may change the driving direction of the robot cleaner 1 by rotating the body unit 110 in a direction in which the obstacle is not detected (220). On the other hand, if the obstacle is not detected as a result of the detection of the sensor 123, the driving device 112 may be controlled to drive the robot cleaner 1 (240).

While the robot cleaner 1 is traveling, the sensor 123 may detect an obstacle in real time (250). If an obstacle is detected in the driving direction of the robot cleaner 1 as a result of the sensing, the controller 100 may change the driving direction of the robot cleaner 1 by rotating the body unit 110 in a direction in which the obstacle is not detected (220). On the other hand, if the obstacle is not detected as a result of the detection of the sensor 123, the driving device 112 may be controlled to drive the robot cleaner 1 (260).

That is, while the robot cleaner 1 runs in the cleaning space, the sensor 123 may detect an obstacle located in the cleaning space in real time. If an obstacle is detected, the controller 100 may rotate the body unit 110 independently of the brush unit 130 to change the driving direction of the robot cleaner 1 in a direction in which the obstacle is not located. In addition, when the cleaning of the cleaning space is completed, the cleaning may be terminated (270).

Meanwhile, the disclosed embodiments may be implemented in the form of a recording medium for storing instructions executable by a computer. The instructions may be stored in the form of a program code, and when executed by a processor, may generate a program module to perform the operations of the disclosed embodiments. The recording medium may be implemented as a computer-readable recording medium.

The computer-readable recording medium includes all kinds of recording media having stored thereon instructions which can be read by a computer. For example, there may be read only memory (ROM), random access memory (RAM), a magnetic tape, a magnetic disk, a flash memory, an optical data storage device, and the like.

As described above, the disclosed embodiments have been described with reference to the accompanying drawings. Although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. A robot cleaner comprising:
 a brush unit having a suction flow path;
 a body unit having a driving device, and coupled to the brush unit to be rotatable with respect to the brush unit; and
 a redirection device configured to rotate the body unit with respect to the brush unit, wherein the redirection device includes:
  a rotation guide extending along an inner circumferential surface of the brush unit;
  a rotation driving source disposed in the body unit and generating power; and
  a power transmission member which moves along the rotation guide by the power transmitted from the rotation driving source and rotates the body unit with respect to the brush unit.

2. The robot cleaner of claim 1, wherein the power transmission member includes:
 a first gear connected to the rotation driving source; and
 a second gear that rotates by receiving power from the first gear and moves along the rotation guide.

3. The robot cleaner of claim 1, wherein the rotation guide is continuously formed along an inner circumferential direction of the brush unit.

4. The robot cleaner of claim 1,
 wherein the body unit includes a dust collecting path for guiding foreign matter to a dust collecting device, and
 wherein the suction flow path and the dust collecting path are formed between the inner circumferential surface of the brush unit and an outer circumferential surface of the brush unit and are connected by a connection flow path extending along a circumferential direction of the body unit.

5. The robot cleaner of claim 4,
wherein the body unit includes a first flow path former continuously extending along an outer circumferential surface of the body unit to form an inner side of the connection flow path, and
wherein the brush unit includes a second flow path former extending along the inner circumferential surface of the brush unit to form an outer side of the connection flow path and coupled to the first flow path former.

6. The robot cleaner of claim 1, wherein the brush unit includes a guide portion extending along a rotation direction of the body unit to guide the rotation of the body unit.

7. A robot cleaner comprising:
a brush unit having a suction flow path;
a body unit coupled to the brush unit to be rotatable with respect to the brush unit;
a redirection device having a rotation guide extending along an inner circumferential surface of the brush unit;
a sensor configured to detect an obstacle; and
a controller configured to change a driving direction of the robot cleaner by rotating the body unit along the rotation guide when the sensor detects the obstacle.

8. The robot cleaner of claim 7, wherein the controller rotates the body unit in a direction in which the obstacle is not detected by the sensor when the sensor detects the obstacle.

9. The robot cleaner of claim 7, wherein the controller rotates the body unit at a predetermined angle when the sensor detects the obstacle, and determines whether another obstacle is detected by the sensor after the rotation of the body unit is completed.

10. The robot cleaner of claim 7, wherein the controller controls the robot cleaner to drive when no obstacle is detected by the sensor after changing the driving direction of the robot cleaner by rotating the body unit.

11. The robot cleaner of claim 7, wherein the controller rotates the body unit in a direction in which the obstacle is not detected by the sensor when the obstacle is detected by the sensor after changing the driving direction of the robot cleaner by rotating the body unit.

12. The robot cleaner of claim 7, wherein the controller controls the body unit to rotate by 90° based on the driving direction without rotating the brush unit such that the robot cleaner drives in a direction perpendicular to the driving direction.

13. The robot cleaner of claim 7, wherein the controller controls the body unit to rotate by 180° based on the driving direction without rotating the brush unit such that the robot cleaner travels in a direction opposite to the driving direction.

14. The robot cleaner of claim 7, wherein the controller rotates the body unit by 360° without rotating the brush unit.

15. The robot cleaner of claim 7, wherein the sensor is provided in the body unit.

* * * * *